United States Patent
Shiraki

(10) Patent No.: US 8,997,947 B2
(45) Date of Patent: Apr. 7, 2015

(54) BRAKE DEVICE

(75) Inventor: Takahiro Shiraki, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 3 days.

(21) Appl. No.: 14/005,745

(22) PCT Filed: Mar. 18, 2011

(86) PCT No.: PCT/JP2011/001628
§ 371 (c)(1),
(2), (4) Date: Sep. 17, 2013

(87) PCT Pub. No.: WO2012/127514
PCT Pub. Date: Sep. 27, 2012

(65) Prior Publication Data
US 2014/0000990 A1   Jan. 2, 2014

(51) Int. Cl.
*F16D 55/226* (2006.01)
*F16D 65/38* (2006.01)
*F16D 65/66* (2006.01)
*F16D 65/56* (2006.01)
*F16D 121/04* (2012.01)
*F16D 121/24* (2012.01)
*F16D 121/02* (2012.01)
*F16D 123/00* (2012.01)
*F16D 125/26* (2012.01)

(52) U.S. Cl.
CPC ............ *F16D 65/38* (2013.01); *F16D 65/66* (2013.01); *F16D 55/226* (2013.01); *F16D 65/567* (2013.01); *F16D 2065/386* (2013.01); *F16D 2121/04* (2013.01); *F16D 2121/24* (2013.01); *F16D 2121/02* (2013.01); *F16D 2123/00* (2013.01); *F16D 2125/26* (2013.01)

(58) Field of Classification Search
USPC ........ 188/1.11 E, 1.11 L, 72.1–72.8, 156–164
See application file for complete search history.

(56) References Cited

U.S. PATENT DOCUMENTS

| | | | | |
|---|---|---|---|---|
| 3,920,103 A | * | 11/1975 | Haraikawa | ............ 188/71.9 |
| 3,934,684 A | | 1/1976 | Evans | |
| 4,006,802 A | | 2/1977 | Evans | |
| 4,660,684 A | | 4/1987 | Carre et al. | |

(Continued)

FOREIGN PATENT DOCUMENTS

| | | |
|---|---|---|
| JP | A-50-124066 | 9/1975 |
| JP | A-59-131047 | 7/1984 |

(Continued)

*Primary Examiner* — Christopher Schwartz
(74) *Attorney, Agent, or Firm* — Oliff PLC

(57) ABSTRACT

A friction brake device for a vehicle includes: a hydraulic brake unit including a piston member for pressing a friction member by advancement; an electric brake unit including a nut member being relatively movable in a piston movement direction with respect to the piston member by a motor and for pressing the piston member by advancement; a piston return mechanism including a biasing member for making biasing force, oriented in a retreat direction, elastically act on the piston member in accordance with a relative advancement amount of the piston member with respect to the nut member; and a controller for controlling the motor. The controller determines whether an adjustment permission condition associated with a wear amount of the friction member is satisfied. When the condition is satisfied, the controller allows the motor to perform a relative position adjustment of the nut member with respect to the piston member.

10 Claims, 7 Drawing Sheets

(56) References Cited

U.S. PATENT DOCUMENTS

| | | | |
|---|---|---|---|
| 4,779,711 A * | 10/1988 | Fabbro et al. | 188/196 D |
| 6,053,289 A * | 4/2000 | Bauer et al. | 188/71.9 |
| 6,311,807 B1 | 11/2001 | Rinsma | |
| 6,655,506 B2 * | 12/2003 | Pfeil et al. | 188/156 |
| 7,104,364 B2 * | 9/2006 | Godlewsky et al. | 188/1.11 L |
| 8,776,958 B2 * | 7/2014 | Shiraki | 188/72.4 |
| 2007/0062769 A1 * | 3/2007 | Noh | 188/265 |
| 2007/0267255 A1 * | 11/2007 | Inagaki et al. | 188/72.4 |
| 2008/0283345 A1 * | 11/2008 | Balz et al. | 188/72.6 |
| 2011/0308898 A1 | 12/2011 | Shiraki | |

FOREIGN PATENT DOCUMENTS

| | | |
|---|---|---|
| JP | A-05-321961 | 12/1993 |
| JP | A-2000-283195 | 10/2000 |
| JP | A-2006-177532 | 7/2006 |
| WO | WO 2010/097938 A1 | 9/2010 |

* cited by examiner

, # BRAKE DEVICE

TECHNICAL FIELD

The present invention relates to a brake device for a vehicle.

BACKGROUND ART

For example, Patent Document 1 discloses an electric disc brake device in which braking force is generated by converting a rotational movement of a rotor, which is generated by an electric motor, into a linear movement of a piston via a transmission mechanism and by pressing a brake pad against a disk rotor with a movement of the piston. This brake device comprises a pad wear compensation mechanism that includes: an adjusting screw provided between the transmission mechanism and the piston; a limiter for transmitting only a rotational displacement exceeding a predetermined range of the rotor, which is provided between the adjusting screw and the rotor; and a one-way clutch, in which, when a rotational displacement of the rotor, occurring when a brake is activated, have exceeded the predetermined range of the rotor, a piston is advanced toward the disk rotor by transmitting a rotational displacement of the rotor, occurring when a brake is released, to the adjusting screw via the one-way clutch.

Patent Document

[Patent Document 1] Japanese Patent Application Publication No. 2000-283195

DISCLOSURE OF THE INVENTION

Problem to be Solved by the Invention

A brake piston is provided to be spaced apart from a brake pad by a narrow clearance, taking into consideration various requirements on performance, such as a braking performance and brake feeling. This clearance is determined such that, even in the initial state where the brake pad is not worn, dragging of braking can be prevented. As the wear of the brake pad progresses, the clearance becomes wider and the stroke of the piston for pushing out the pad becomes larger than that in the initial state. It is desirable to suppress such a stroke of a piston from being excessively large.

In view of these situations, a purpose of the present invention is to provide a brake device suitable as a so-called built-in brake device, in which the positions of movable components in the brake device can be appropriately adjusted.

Means for Solving the Problem

An embodiment of the present invention is a friction brake device for a vehicle, which comprises: a hydraulic brake unit including a piston member that is configured to be movable by an action of brake fluid pressure and to press a friction member by advancement; an electric brake unit including a nut member that is configured to be relatively movable in a piston movement direction with respect to the piston member by a motor and to press the piston member by advancement; a piston return mechanism including a biasing member that is arranged so as to make biasing force, oriented in a retreat direction, elastically act on the piston member in accordance with a relative advancement amount of the piston member with respect to the nut member; and a controller for controlling the motor, in which the controller determines whether an adjustment permission condition associated with a wear amount of the friction member is satisfied, and when the condition is satisfied, the controller allows the motor to perform a relative position adjustment of the nut member with respect to the piston member.

A brake device according to another embodiment of the present invention comprises: a first movable member configured to contact and press a friction member and to be driven by a first driving source; a second movable member that is configured to make the first movable member to press the friction member by contacting and pressing the first movable member and that is configured to be driven by a second driving source different from the first driving source; a first movable member-pulling back mechanism that is provided, in order to release a brake, between the first movable member and the second movable member to pull back, by an engagement between the first movable member and the second movable member, the first movable member in a direction opposite to a pressing direction in which the friction member is pressed; and a controller configured to determine, based on the wear amount of the friction member, whether it is needed to perform, by the second driving source, a relative position adjustment of the second movable member with respect to the first movable member.

Advantage of the Invention

According to the present invention, positions of movable components in a brake device can be appropriately adjusted.

BEST MODE FOR CARRYING OUT THE INVENTION

Figure 1:
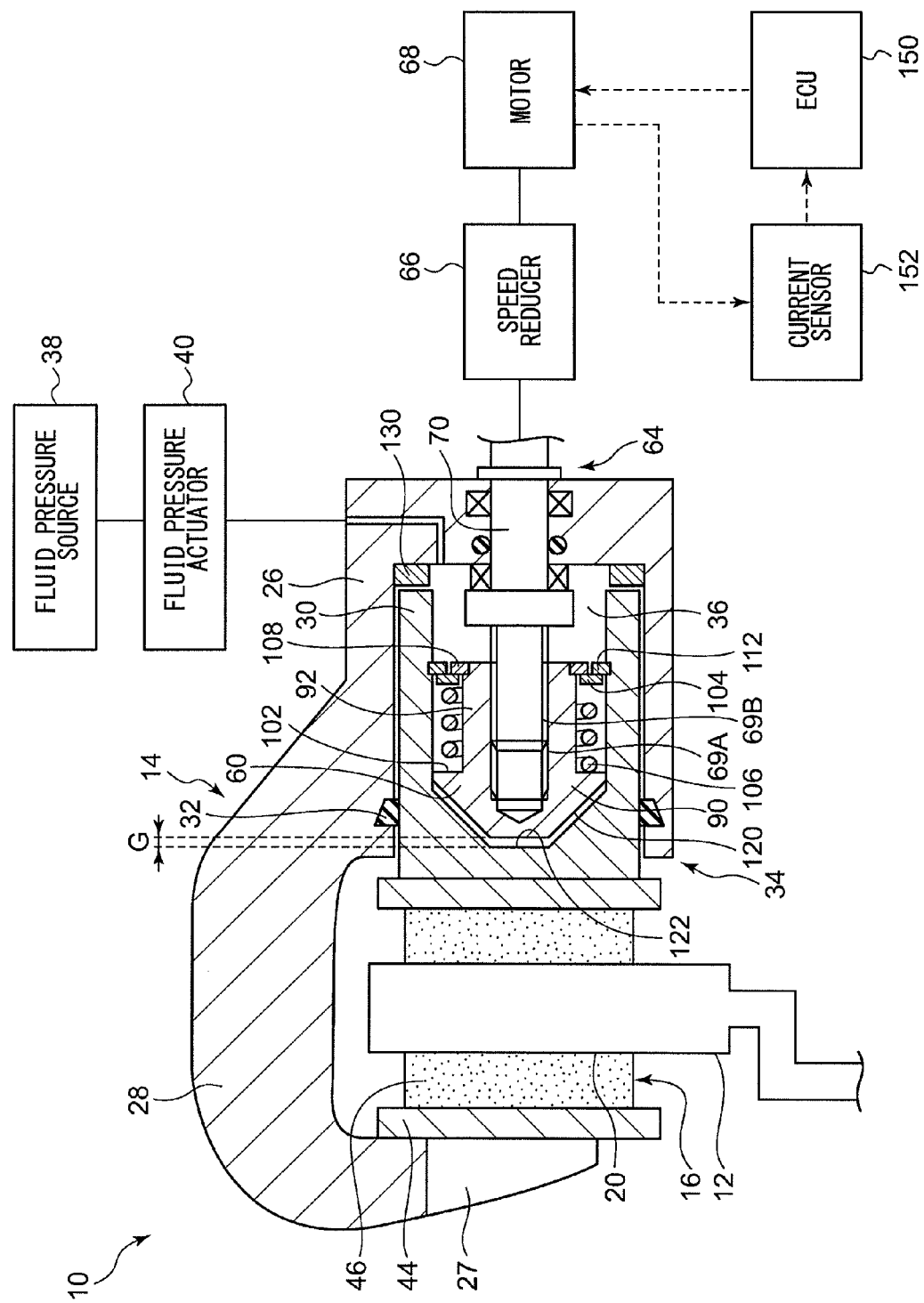
FIG. 1 is a sectional view schematically illustrating a configuration of a brake device according to an embodiment of the present invention.

A friction brake device according to an embodiment of the present invention comprises two movable members that can be respectively and individually driven by driving sources different from each other. The brake device is configured such that a first movable member presses a friction member by a first driving source and a second movable member presses, by a second driving source, the friction member via the first movable member. When a brake is activated, the second movable member presses the first movable member and the friction member with, for example, a front part of the second movable member being engaged with the first movable member; while, when a brake is released, the second movable member pulls back the first movable member to a return position determined by a position of the second movable member with, for example, a back part of the second movable member being engaged with the first movable member. The brake device determines, based on the wear amount of the friction member, whether it is needed to perform the relative position adjustment of the second movable member with respect to the first movable member. When it is determined that it is needed, the brake device executes the relative position adjustment at a subsequent appropriate timing by driving the second movable member.

According to this configuration, because the first movable member is pulled back by the engagement between the second movable member and the first movable member when a brake is released, dragging of braking can be well reduced or prevented. If the second movable member remains at a constant position, a stroke of the first movable member with respect to the second movable member, occurring when a brake is activated, becomes larger, as a thickness of the friction member becomes smaller due to wear. By determining, based on the wear amount of the friction member, whether it is needed to perform the relative position adjustment of the first and the second movable members and by executing the adjustment at an appropriate time, it becomes possible to maintain the stroke of the first movable member within a desired acceptable range by suppressing an excessive extension of the stroke thereof.

In an embodiment, the brake device may comprise a controller for controlling the drive of the second movable member. This controller determines whether an adjustment permission condition associated with the wear amount of the friction member is satisfied, and when the condition is satisfied, the controller allows the relative position adjustment of the second movable member with respect to the first movable member. The controller may determine that, when a wear indicator amount, which reflects the wear amount of the friction member, exceeds a threshold value, the adjustment permission condition is satisfied. By determining with the use of a wear indicator amount, which reflects a wear amount, instead of an actual wear amount, the determination can be easily performed without actual measurement of the wear amount. The wear indicator amount may be, for example, any one of an estimated value of the wear amount, integrated value of a brake load, accumulated number of times of IG on/off, and integrated travel distance of vehicle. Hereinafter, for brevity of description, the expression of a wear amount can mean "a wear amount or a wear indicator amount", as far as the context allows.

The controller may determine that, when the wear amount or the wear indicator amount is increased by at least a threshold value in comparison with a wear amount, or a wear indicator amount that reflects the wear amount, of the friction member in the last activation of the second movable member, the permission condition is satisfied. In order to achieve that, the controller may resets the wear amount or wear indicator amount when the second movable member is activated, and may integrate a wear amount or wear indicator amount from that point. It is preferable that: the controller stores the wear amount or wear indicator amount in a memory when switched to the IG-off state; and also integrates it successively thereafter.

Alternatively, on the premise that the adjustment permission condition is satisfied, the controller may determine whether an adjustment execution condition that is based on a vehicle state is satisfied, and when the condition is satisfied, the controller may execute the relative position adjustment. For example, the controller may determine that the adjustment execution condition is satisfied when a vehicle is in a parked state. By determining the adjustment execution condition apart from the adjustment permission condition, the detection that an adjustment needs to be executed and the adjustment can be executed at different timings. Accordingly, an adjustment can be executed at a timing selected such that travelling of a vehicle and others are not hampered.

The relative position adjustment may be an operation in which the second movable member is brought close to the first movable member by activating the second driving source. In this case, the operation may be performed exclusively for position adjustment. Alternatively, the relative position adjustment may be an operation in which the second movable member is brought close to the first movable member by activating the second driving source such that the second movable member advances and contacts the first movable member to be pulled back. In this case, this operation is preferred from the viewpoint that the relative position adjustment can be executed by using normal operations of activating and releasing a brake by the second movable member.

In a preferred embodiment, the brake device comprises a first movable member-pulling back mechanism including a biasing member for making biasing force, oriented in a direction opposite to a pressing direction in which the first movable member is pressed, elastically act on the first movable member in accordance with a relative movement amount in the pressing direction of the first movable member with respect to the second movable member. This pulling back mechanism is provided between the first movable member and the second movable member. With such a configuration, it becomes possible that, as the relative movement amount of the first movable member becomes larger, larger pulling back force, which corresponds to the relative movement amount, can act on the first movable member by the elastic biasing force. Because the first movable member can be pulled back with sufficient restoring force, dragging of braking, possibly occurring when a brake is released, can be effectively suppressed.

The first movable member-pulling back mechanism may include a supporting part for supporting the biasing member. One end of the biasing member is attached to one of the first and the second movable members and the other end is attached to the supporting part, and the supporting part may be arranged to be able to contact the other of the first and the second movable members by a relative movement of the two movable members. With such a configuration, it can be relatively easily achieved that the biasing force is increased when the first movable member advances with respect to the second movable member and is reduced when the first movable member retreats.

The first and the second movable members may be arranged to have, in a movement direction of the two movable members, a clearance by which the second movable member can retreat from the first movable member in a non-contact manner. Because the two movable members are not engaged with each other in the clearance, the second movable member can be driven with substantially no load. By distinguishing this no load state from a load state in which the two movable members are engaged with each other, the engagement between the two movable members can be detected. This detection may be made based on a measured value of a motor current for driving the second movable member, or, for example, on a measured distortion value of the first movable member or the second movable member.

In a preferred embodiment, the first movable member may be a piston member that is configured to be movable by an action of brake fluid pressure and to press a friction member by advancement. In this case, the brake device may comprise a hydraulic brake unit for providing fluid pressure for driving the piston member. The second movable member may be a nut member that is configured to be relatively movable in a piston movement direction with respect to the piston member by a motor and to press the piston member by advancement. In this case, the brake device may comprise an electric brake unit including a motor for driving the nut member. Alternatively, the first movable member may be configured to be driven by a driving method other than fluid pressure, and the second movable member may be configured to be driven by a driving method other than electroactuation.

An electric brake device according to an embodiment is configured: to brake a vehicle by supplying oil pressure to a back side of a caliper piston in normal braking; and to maintain braking force by pressing a piston with a nut provided inside the piston when a vehicle is being parked. This brake device is configured such that the piston and the nut can retreat integrally with each other by engaging them via a spring. Further, this device is configured such that the relative position between the piston and the nut is adjusted in accordance with a wear state of a brake pad. The wear state is detected based on an integrated value of a pad wear amount, brake operation situation, number of times of IG on/off, and travel distance of vehicle, etc. With this configuration, the relative position between the piston and the nut can be appropriately adjusted even when a brake pad wear state has been changed by normal braking. Accordingly, dragging of a brake pad can be reduced and a good brake feeling can be obtained.

FIG. 1 is a view schematically illustrating the configuration of a brake device 10 according to an embodiment of the present invention. The brake device 10 is, for example, a so-called built-in disk brake, and can be activated as both a service brake and a parking brake.

The brake device 10 comprises: a disk rotor 12 that rotates with a wheel; and a caliper (floating caliper in the present embodiment) 14 supported by a non-illustrated non-rotational member in a way of being relatively movable in a direction parallel to a rotational axis line of a wheel. A pair of pads 16, as a friction member, are held by the non-rotational member in a way in which the respective pads 16 can be brought close to or away from a friction surface 20 of the disk rotor 12. The caliper 14 is supported in an attitude in which it spans over the disk rotor 12 and the pair of pads 16, and is formed by a cylinder main body 26, a reaction part 27, and a connection part 28 that connects them together.

A cylinder bore is formed in the cylinder main body 26, and a piston 30 is fitted thereinto in a way of being liquid-tight and being slidable in the shaft line. A ring-shaped piston seal 32 is provided between the cylinder bore and the piston 30. A brake cylinder 34 is formed by the cylinder main body 26 and the piston 30, etc., and a fluid pressure chamber 36 is formed on a side of the cylinder bore, toward which the piston 30 retreats. Hereinafter, the piston 30 and components, the components being movable in the shaft direction accompanying and integrally with the piston 30, are collectively referred to as a "piston member 30" in some cases. That is, the piston member 30 is configured to be movable by an action of brake fluid pressure and to press the friction member by advancement.

Hereinafter, the direction in which the piston 30 approaches the pad 16 is appropriately referred to as an "advancement direction" and the direction in which the piston 30 is away from the pad 16 referred to as a "retreat direction" in some cases. With respect to the movable components other than the piston 30 (e.g., a later-described nut member 60), the terms of the advancement and retreat, having the same meanings as above, are also used. Similarly, with respect to the terms representing positions, a portion close to the pad 16 is sometimes referred to, for example, as a front part or front, and a portion away therefrom referred to as a back part, back, or the like.

A fluid pressure source 38 is connected to the fluid pressure chamber 36 via a fluid pressure actuator 40. The fluid pressure source 38 includes both a master cylinder that generates fluid pressure by a brake operation of a driver and a power-driven fluid pressure source (e.g., an accumulator and a pump) that generates fluid pressure by a supply of power. Alternatively, the fluid pressure source 38 may be formed to include at least one of the master cylinder and the power-driven fluid pressure source. The fluid pressure actuator 40 includes one or more fluid pressure control valves for controlling the fluid pressure supplied from the fluid pressure source 38 so as to be target fluid pressure to be provided to the fluid pressure chamber 36. A hydraulic brake unit is formed to include the fluid pressure source 38, the fluid pressure actuator 40, and the brake cylinder 34. For example, the configuration of a publicly-known hydraulic brake device for a vehicle can be adopted as the hydraulic brake unit, and hence detailed description thereof will be appropriately omitted for brevity's sake.

Each of the pair of pads 16 includes a back plate 44 and a friction material 46 fixed to the back plate 44. Of the pair of pads 16, the back plate 44 located close to the piston member 30 is contacted and pressed by the piston member 30, and accordingly the friction material 46 is pressed against the disk rotor 12. With the friction material 46 and the disk rotor 12 being friction engaged with each other, the brake device 10 generates braking force. The rotation of a wheel is suppressed by the braking force. The braking force is generated in accordance with the pressing force of the friction material 46 against the disk rotor 12, and as the pressing force becomes larger, the braking force capable of acting on a wheel becomes larger.

The piston 30 has a bottomed cylindrical shape and is arranged in an attitude in which it extends in the shaft direction and the bottom is located on the advancement side and the tube part on the retreat side. The nut member 60 is held on the inner circumference side of the piston 30 in a state in which the nut member 60 is relatively movable in the shaft direction with respect to the piston 30 and is not relatively rotatable therewith.

The nut member 60 is connected to an electric motor 68 such that the nut member 60 is relatively moved in the shaft direction with respect to the piston 30 by the drive of the electric motor 68. The nut member 60 is configured to be relatively movable in the piston movement direction with respect to the piston member 30 by the motor 68 and to press the piston member 30 from the back surface 122 thereof by advancement.

The nut member 60 and the electric motor 68 are connected together via a power transmission mechanism 64. The power transmission mechanism 64 includes, for example, a speed reducer 66 for reducing the rotation outputted by the electric motor 68. The power transmission mechanism 64 may include another rotation transmission mechanism. The speed reducer 66 is interposed between the output shaft of the electric motor 68 and a rotational shaft (spindle) 70.

The power transmission mechanism 64 includes a movement conversion mechanism for converting a rotational movement into a linear movement, for example, a screw mechanism. A male screw part 69A formed on the inner circumferential surface of the nut member 60 and a female screw part 69B formed on the outer circumferential surface of the rotational shaft (spindle) 70 are screwed with each other, so that the nut member 60 is linearly moved with the rotation of the spindle 70. The spindle 70 is held in a relatively rotatable manner by the cylinder main body 26 via a radial bearing and a thrust bearing.

The screw parts 69A and 69B are formed such that, even when force oriented in the shaft direction is applied to the nut member 60 via the piston 30 in a state where a current is not supplied to the electric motor 68, the electric motor 68 is not rotated by the component force of the force. Accordingly, lead angles of the screw parts 69A and 68B are made small. Thus, the electric brake unit is configured to include the power transmission mechanism 64 that is configured to connect the nut member 60 to the motor 68 and to maintain the position of the nut member 60 when the motor 68 is not in operation. The power transmission mechanism 64 has a function as a lock mechanism for the nut member 60. That is, the nut member 60 remains still when the electric motor 68 is not in a non-operation state, and the position thereof is fixed with respect to the cylinder main body 26.

The electric brake unit is configured to include the electric motor 68, the power transmission mechanism 64, and the nut member 60. For example, the configuration of a publicly-known built-in electric brake mechanism can be adopted as the electric brake unit, and hence description thereof will be omitted for brevity's sake. The brake device 10 can be activated as a service brake by the aforementioned hydraulic brake unit, and can be activated as a parking brake by the electric brake unit.

The nut member 60 has a stepped shape having a large-diameter part 90 and a small-diameter part 92, and is arranged in an attitude in which it extends in the shaft direction and the large-diameter part 90 is located on the advancement side (bottom side of the piston 30) and the small-diameter part 92 on the retreat side. An anti-rotation mechanism is provided between the large-diameter part 90 and the piston 30. Thereby, the nut member 60 is made not to be relatively rotatable with respect to the piston 30.

An engagement part 100 for being engaged with the piston member 30 is provided in the nut member 60. A piston return mechanism is configured to include the engagement part 100. The piston return mechanism is formed between the piston member 30 and the nut member 60 such that the piston member 30 is pulled back in the retreat direction by an engagement between the piston member 30 and the nut member 60. The piston return mechanism includes a biasing member (e.g., a later-described spring 106) that is arranged so as to make biasing force, oriented in the retreat direction, elastically act on the piston member 30 in accordance with a relative advancement amount of the piston member 30 with respect to the nut member 60, the advancement of the piston member 30 being made by brake fluid pressure.

The piston member 30 is pulled back, by the piston return mechanism, to the initial position determined by the position of the nut member 60. This initial position is a movement start position of the piston member 30 in every braking, and is updated by the later-described relative position adjustment or activation of the electric brake unit.

The engagement part 100 includes a spring fixing part 102, a spring supporting part 104, the spring 106, and a set load defining part 108. A part, having a ring-shaped section that is located between the large-diameter part 90 and the small-diameter part 92 of the nut member 60 to connect the two parts together, is the spring fixing part 102. In the small-diameter part 92, a protruding part projected radially outward is fixedly provided in a portion spaced apart, in the shaft direction, from the spring fixing part 102 to the retreat side, and this protruding part is made to be the set load defining part 108. The set load defining part 108 is, for example, a retainer fixed to the back end of the nut member 60, the back end being located in the shaft direction. The spring supporting part 104 having an approximately annular plate shape is arranged between the spring fixing part 102 and the set load defining part 108, so as to be relatively movable in the shaft direction with respect to the nut member 60. The spring supporting part 104 is, for example, a washer.

The spring 106 is attached between the spring fixing part 102 and the spring supporting part 104 in a way in which one end of the spring 106 is fixed to the spring fixing part 102 and the other end to the spring supporting part 104. The spring 106 is, for example, a coil spring that is arranged coaxially with the spindle 70 so as to surround the small-diameter part 92 of the nut member 60.

In a state where the spring supporting part 104 contacts the set load defining part 108, the spring 106 is held in a state where a set load is provided. In the illustrated example, the set load is a load that compresses the spring 106. It is desirable in terms of design to set the set load to a magnitude at which the spring 106 is not elastically deformed (i.e., the compressive deformation amount of the spring 106 is not increased) when the piston member 30 is made to retreat with the retreat of the nut member 60. In that case, the set load is set to a magnitude larger than or equal to a load (push-back load) corresponding to the sliding resistance between the piston member 30 and the cylinder main body 26 (mainly, piston seal 32). With such a setting, when the nut member 60 is pulled back integrally with the piston member 30, it can be swiftly pulled back without providing a further compressive deformation to the spring 106.

The set load defining part 108 also functions as a retaining mechanism for the spring supporting part 104 and the spring 106. As far as fulfilling such a function, the set load defining part 108 may be a member that is annually and continuously provided around the whole circumference of the outer circumferential surface of the small-diameter part 92, or a member that is annually and partially provided therearound. Also, the set load defining part 108 may be a member provided by being press-fitted around the nut member 60, a member provided by being shut in with the use of a screw mechanism (e.g., multiple pins and screws, etc.), or a member held so as not to be relatively movable by a C-ring, etc.

On the other hand, a protruding part 112 projected radially inward is provided in the tube part of the piston member 30. The protruding part 112 is provided as a part to be engaged with the engagement part 100 and forms part of the piston return mechanism. The protruding part 112 also functions as a retaining mechanism for the nut member 60. In the example illustrated in FIG. 1, the protruding part 112 is provided at a portion, located on the retreat side of the engagement part 100 of the nut member 60, in the middle of the tube part of the piston member 30; however, the protruding part 112 may be provided at the end on the retreat side of the tube part of the piston member 30. That is, a part that protrudes inward may be provided in a skirt part of the piston 30.

The protruding part 112 may be annually and continuously provided on the inner circumferential surface of the tube part of the piston member 30, or may be provided annually and partially provided thereon. For example, the protruding part 112 may be a C-ring attached to a groove that is formed on the inner circumferential surface of the piston member 30, or an annual member press-fitted around the inner circumferential surface thereof. Also, the protruding part 112 may be multiple pins or screws embedded in the inner circumferential surface so as to protrude radially inward, or a screw part (without head) provided by using a screw mechanism.

The inner diameter of the protruding part 112 (inner diameter determined by a portion that is projected toward the innermost side of the protruding part 112) is larger than the outer diameter of the set load defining part 108 (outer diameter determined by a portion that is projected toward the outermost side of the protruding part 108). Thus, it is configured that, when the piston member 30 and the nut member 60 are moved relatively with each other, the set load defining part 108 and the protruding part 112 do not interfere with each other.

The inner diameter of the protruding part 112 is smaller than the outer diameter of the spring supporting part 104. Thereby, it is configured that, when the piston member 30 and the nut member 60 are moved relatively with each other (in particular, when the piston member 30 relatively advances with respect to the nut member 60), the protruding part 112 can contact the spring supporting part 104. With the spring 106 being made to be able to elastically deformed by the protruding part 112 contacting the spring supporting part 104, a relative movement of the piston member 30 and the nut member 60 is allowed.

Thus, one end of the spring 106 is attached to the nut member 60 and the other end thereof is attached to the spring supporting part 104, and the spring supporting part 104 is arranged to be able to contact the piston member 30 (protruding part 112 thereof) by a relative movement of the piston member 30 and the nut member 60. As described later, in other embodiments, it is also possible that one end of the spring 106 is attached to the piston member 30 and the other end thereof is attached to a spring supporting part and that the supporting part is arranged to be able to contact the nut member 60 by a relative movement of the piston member 30 and the nut member 60.

As illustrated in FIG. 1, in a state where the spring supporting part 104 contacts the set load defining part 108 in the nut member 60, a clearance G, oriented in the shaft direction, is formed between the front end surface 120 of the nut member 60 and the back surface 122 of the piston member 30. The nut member 60 is arranged in the piston member 30 in a state where the clearance G is created. In a state where the front end surface 120 of the nut member 60 contacts the back surface 122 of the piston member 30, the clearance G is formed between the spring supporting part 104 and the protruding part 112. Thus, the nut member 60 and the piston member 30 are arranged to have, in the piston movement direction, the clearance G between them, with which the nut member 60 retreats from the piston member in a non-contact manner. As described later, by providing this clearance, it becomes possible to make the nut member 60 retreat in no load operation or with a slight load when a brake is released.

Further, a stopper 130 is provided at the end portion on the retreat side of the cylinder bore. The stopper 130 is used for defining a retreat end position of the piston member 30 and it is rigid in the present embodiment; however, it may be made of an elastic member.

One of the essential points regarding the configuration of the aforementioned brake device 10 is that, by configuring the piston member 30 and the nut member 60 to be able to be engaged with each other via the spring 106, the piston member 30 can be advanced by warping the spring 106 when brake fluid pressure acts. At the time, the load acting on the spring 106 acts as reaction force for making the piston member 30 retreat. This reaction force is, so to speak, restoring force by which the piston member 30 is pulled back when a brake is released and fluid pressure is removed. Thus, it can be substantially guaranteed that the piston member 30 may be pulled back to the initial position from which it has begun to advance. Accordingly, dragging of braking, possibly occurring when a brake is released in normal braking, can be reduced or prevented.

Also, when a parking brake is released, a similar dragging reducing effect can be expected, because the nut member 60 is pulled back by the drive of the motor 68 and can be pulled back integrally with the piston member 30. In particular, even when a parking brake is engaged with relatively strong force, the piston member 30 can be pulled back well.

The electric motor 68 is controlled based on a command of an ECU 150. The electric motor 68 is connected to the ECU 150 via a non-illustrated motor drive circuit. A current sensor 152 for detecting a current flowing through the electric motor 68 is provided, for example, in associated with the motor drive circuit. Values detected by the current sensor 152 are sequentially provided to the ECU 150 at predetermined intervals to be stored and maintained in a predetermined storage area in the ECU 150.

In response to an operation command by a driver, or to an activation command from another ECU or a vehicle control program in the same vehicle, the ECU 150 controls the electric brake unit including the electric motor 68. That is, the ECU 150 controls the advancement or retreat of the nut member 60 by driving the electric motor 68.

For example, a publicly-known in-vehicle electronic control unit can be adopted as the ECU 150. The ECU 150 is formed as a microprocessor including a CPU, and includes, other than the CPU, a ROM for storing various programs, a RAM for temporarily storing data, an input/output port, and a communication port, etc. Further, a non-volatile memory, which is communicably connected to the ECU 150 and is capable of writing/reading data from/into the ECU 150, is provided integrally with or separately from the ECU 150.

The fluid pressure source 38 and the fluid pressure actuator 40 may be controlled based on a command by the same ECU 150, or controlled based on a command by another ECU different from the ECU 150. When controlled by another ECU, the ECU 150 and the another ECU are communicably connected to each other via a CAN (Car Area Network).

Figure 2:
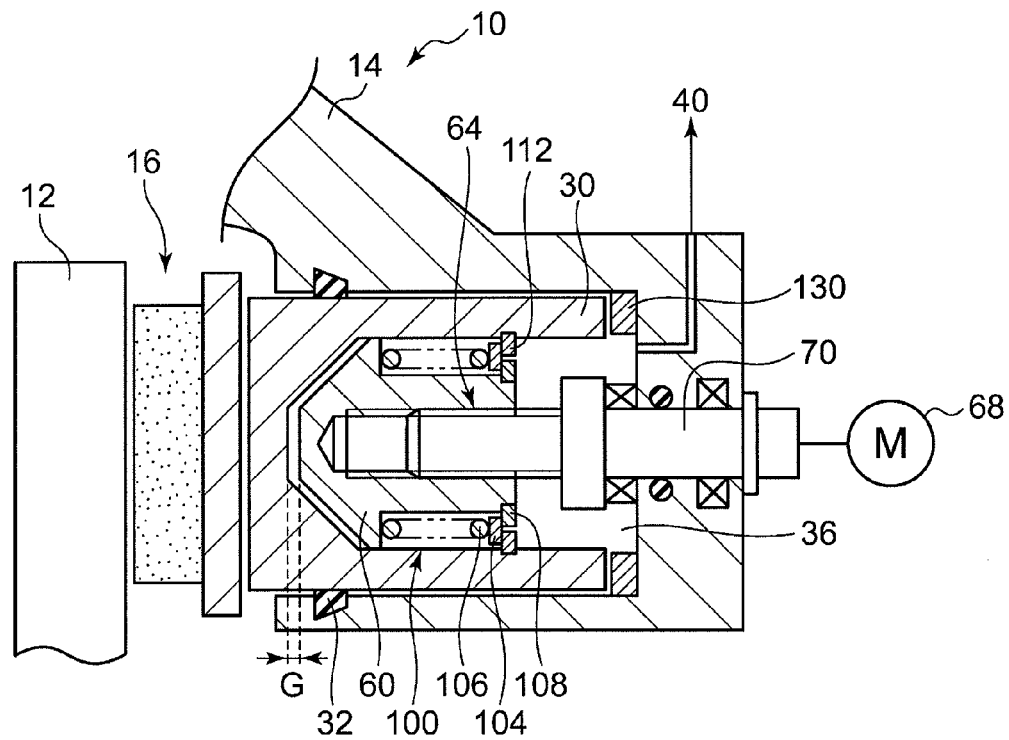
FIG. 2 is a view schematically illustrating a state when a brake device according to an embodiment of the invention is not activated.

Operations of the brake device 10 configured as stated above will be described. FIG. 2 is a view schematically illustrating a state when the brake device 10 according to an embodiment of the present invention is not activated. The brake device 10 is designed such that, when a brake is not activated, the pad 16 is spaced apart from the disk rotor 12 by a small distance in order not to generate dragging. The piston member 30 is also spaced apart from the pad 16 by a small distance. The nut member 60 and the piston member 30 are spaced apart from each other by the aforementioned clearance G. The spring supporting part 104 of the nut member 60 contacts both the set load defining part 108 and the protruding part 112 of the piston member 30, and a set load is acting on the spring 106.

Figure 3:
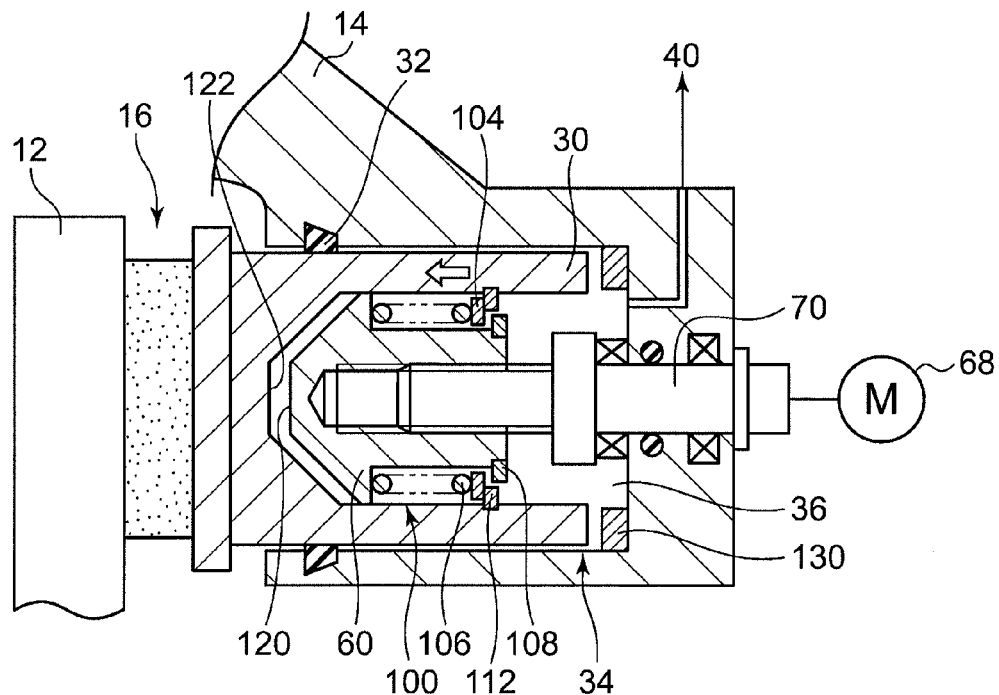
FIG. 3 is a view schematically illustrating a state where a service brake is activated in a brake device according to an embodiment of the invention.

FIG. 3 is a view schematically illustrating a state where a service brake is activated in the brake device 10 according to an embodiment of the present invention. The fluid pressure actuator 40 is activated, for example, by an operation of a driver. Fluid pressure is supplied to the fluid pressure chamber 36 in the brake cylinder 34, and the piston member 30 is advanced with the back surface 122 thereof being applied with the fluid pressure. The protruding part 112 and the spring supporting part 104 are also advanced integrally with the piston member 30. Because the electric motor 68 is in a non-operation state at the time, the nut member 60 is not advanced and is maintained at the position. By an elastic deformation of the spring 106, a relative advancement of the piston member 30 with respect to the nut member 60 is allowed. The spring 106 converts, by being compressed, a relative advancement amount of the piston member 30 into biasing force oriented in the retreat direction of the piston member 30. The pad 16 is pressed against the disk rotor 12 by the advancement of the piston member 30.

When a service brake is released, the pressure of the fluid pressure chamber 36 is reduced by the fluid pressure actuator 40. The piston member 30 can be pulled back to the initial position illustrated in FIG. 2 by the elastic force of the spring 106 in addition to the restoring force acting from the pad 16 and the piston seal 32. In a typical built-in electric brake device, the piston member 30 is made to retreat depending on the restoring force in accordance with the deformations of the caliper 14, the pad 16, and the piston seal 32, occurring when a brake is activated; in the present embodiment, however, dragging of braking can be better prevented by also using the elastic force of the spring 106.

Figure 4:
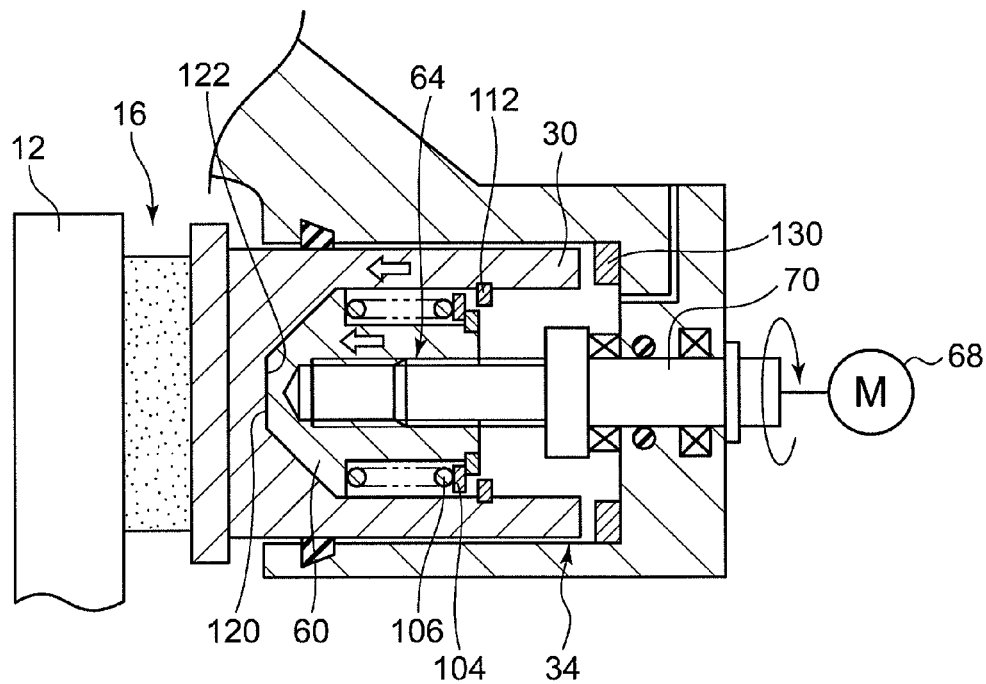
FIG. 4 is a view schematically illustrating a state where a parking brake is activated in a brake device according to an embodiment of the invention.

FIG. 4 is a view schematically illustrating a state where a parking brake is activated in the brake device 10 according an embodiment of the present invention. The ECU 150 advances the nut member 60 by driving the electric motor 68 in response to, for example, an operation by a driver. The nut member 60 and the piston member 30 are pushed forward integrally with each other with the front end surface 120 of the nut member 60 pushing the back surface 122 of the piston member 30 forward. Thus, the pad 16 is pressed against the disk rotor 12 by the advancement of the piston member 30. The electric motor 68 is stopped and the nut member 60 is maintained at the position. Thus, the locking operation of a parking brake is completed. At the time, in the nut member 60, the spring supporting part 104 and the set load defining part 108 contact each other, and the spring 106 advances integrally with the nut member 60 in a state where the set load is acting.

Figure 5:
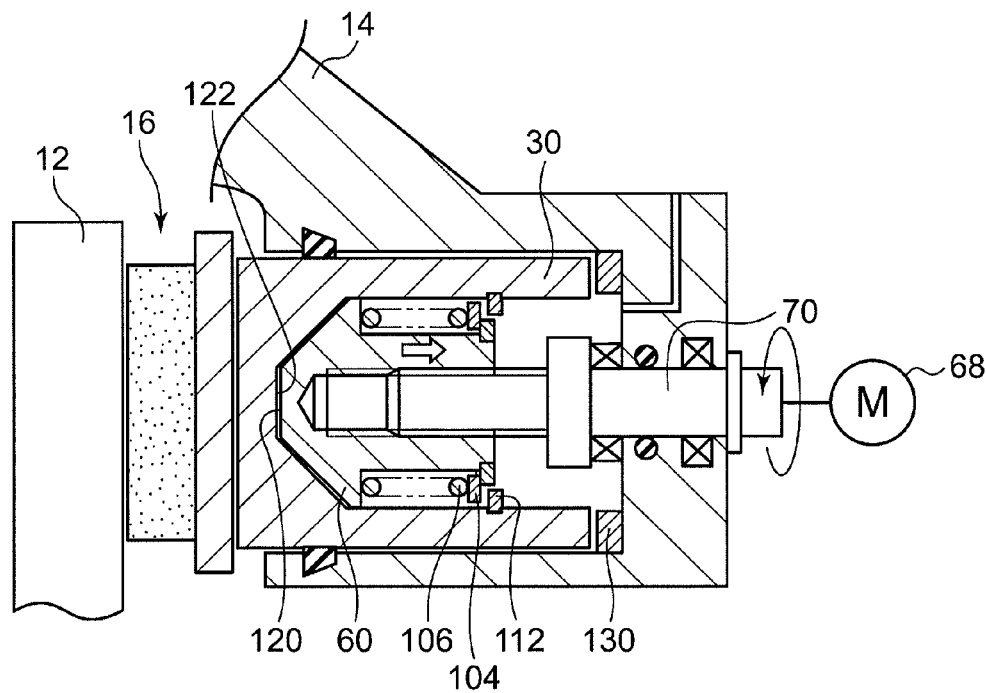
FIG. 5 is a view schematically illustrating an operation of releasing a parking brake in a brake device according to an embodiment of the invention.
Figure 6:
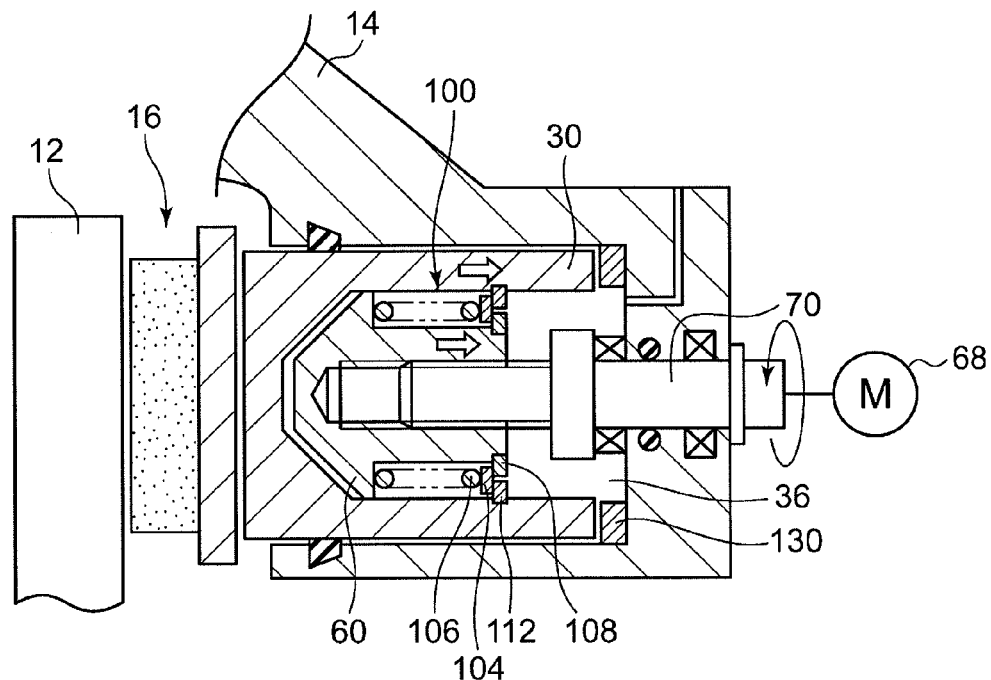
FIG. 6 is a view schematically illustrating an operation of releasing a parking brake in a brake device according to an embodiment of the invention.

FIGS. 5 and 6 are views each schematically illustrating an operation of releasing a parking brake in the brake device 10 according to an embodiment of the present invention. The ECU 150 makes the nut member 60 to retreat by driving the electric motor 68 in a direction opposite to that in the aforementioned locking operation of a parking brake. In the initial stage of this retreat, the piston member 30 also retreats following the nut member 60 by the restoring force of the caliper 14 and the pad 16, etc. However, this restoring force is not necessarily and sufficiently large. Accordingly, the piston member 30 is once stopped as illustrated in FIG. 5, while the nut member 60 retreats alone after being spaced apart from the piston member 30 by the drive of the electric motor 68.

When the nut member 60 is moving within the clearance G after being spaced apart from the piston member 30, the load added to the electric motor 68 becomes very small, which can be assumed to be substantially no-load. Accordingly, a current flowing through the electric motor 68 becomes very small. This state continues before the nut member 60 retreats by a distance of the aforementioned clearance G, and when the nut member 60 contacts the piston member 30, the load on the motor is increased. Accordingly, a threshold value is set to be slightly larger than a no-load current occurring when the motor is in a no-load state, the no-load current having been appropriately obtained by experiment or experience. The ECU 150 compares this threshold value with a measured value of the current sensor 152, and can determine that the nut member 60 contacts the piston member 30 when the measured value exceeds the threshold value.

As illustrated in FIG. 6, when the nut member 60 retreats by a distance of the aforementioned clearance G, the spring supporting part 104 of the nut member 6 contacts the protruding part 112 of the piston member 30. Then, the nut member 60 and the piston member 30 retreat integrally with each other by the engagement between them and by the drive of the electric motor 68. Thus, the piston member 30 can be pulled back to a desired position. For example, the nut member 60 and the piston member 30 can be made to retreat to the initial position illustrated in FIG. 2.

Or, the position to which the nut member 60 is to be pulled back can be adjusted, when a parking brake is released. To achieve that, the ECU 150 may complete an operation of releasing a parking brake, for example, when a measured value of the current sensor 152 exceeds the threshold value or when a predetermined time has elapsed since a measured value exceeded the threshold value, thereby allowing the nut member 60 and the piston member 30 to be stopped. With such a configuration, the nut member 60 can be stopped at an appropriate position in accordance with a wear amount of the pad 16 at the time. As a result, a relative position of the piston member 30 with respect to the nut member 60 can be automatically adjusted.

Also, a situation can be assumed, in which a parking brake is not used for a relatively long period of time and a hydraulic break is often used during the period of time. When the electric brake unit is not activated, the nut member 60 remains at the same position on the spindle 70. The nut member 60 remains at a fixed position with respect to the cylinder main body 26. On the other hand, when a hydraulic brake is activated very frequently, the wear of the pad 16 progresses accordingly. Thus, the thickness of the pad 16 becomes small due to the wear, and the distance between the surface of the pad 16 that contacts the piston member 30 and the nut member 60 becomes large. The piston member 30 is pulled back to the position of the nut member 60 by the action of the spring 106 at the time of the last release of hydraulic brake. Accordingly, an advancement amount of the piston member 30, the amount being required in the next braking, becomes large with the wear of the pad.

That is, the braking stroke of the piston member 30 becomes large as the wear of the pad 16 progresses, by refraining from activation of the electric brake. Although this is preferred from the viewpoint of sufficiently suppressing the dragging that may occur when a brake is released, there is the fear that an effect of braking or a brake feeling may be affected by an excessive extension of the braking stroke. There is also the fear that, if the pad 16 extremely worn away, an advancement amount of the piston member 30, which is required for braking, may exceed an upper limit of a possible relative movement amount of the piston member 30 with respect to the nut member 60, the upper limit being determined in terms of structure.

Accordingly, in an embodiment of the present invention, an excessive extension of the stroke of the piston member 30 is suppressed by advancing the nut member 60 to some extent at an appropriate timing. By advancing the nut member 60 to make the distance to the pad 16 to be small, it becomes possible to move forward a pulled back position of the piston member 30, i.e., an advance start position thereof and to reduce the stroke of the piston member 30. By adjusting the position of the nut member 60 in accordance with a wear amount of the pad 16, apart from an operation of a parking brake by an operation command, the extension of the stroke of the piston member 30, possibly occurring in a situation where a parking brake is not used for a relatively long period of time, can be suppressed.

In an embodiment, the ECU 150 determines whether an adjustment permission condition associated with a wear amount of the pad 16 is satisfied. Herein, the wear amount may be an actual measured value, or a wear indicator amount that reflects a wear amount. When the adjustment permission condition is satisfied, the ECU 150 makes a request for adjusting a relative position of the nut member 60 with respect to the piston member 30 by the electric motor 68. When the relative position adjustment request is made, the ECU 150 determines whether the adjustment execution condition is satisfied. When the adjustment execution condition is satisfied, the ECU 150 executes the relative position adjustment by driving the nut member 60.

This relative position adjustment processing may include at least the following five processing:

1. A pad wear amount since the last activation of a parking brake is integrated. This pad wear amount is integrated before a parking brake is activated or a relative position adjustment request is made. In particular, the integrated amount, occurring at the time when IG is turned off, is stored in a memory without being deleted, and integration is continued.

2. The integrated value of a pad wear amount is reset when a parking brake is activated. In other words, the integrated value of a pad wear amount is not reset before a parking brake is activated or a relative position adjustment is executed.

3. A relative position adjustment is allowed on condition that the integrated value of a pad wear amount exceeds the set value.

4. When a predetermined condition is satisfied, a parking brake is automatically activated even when an operation for a parking brake is not performed, so that the relative position adjustment is executed. This adjustment is performed by executing normal operations of locking and releasing a parking brake.

5. The integrated value of a pad wear amount is cleared after the relative position adjustment is completed.

In order to execute the relative position adjustment processing, the brake device 10 may comprise an integrated pad wear amount storage device, a pad wear limit estimation device, and a nut clearance adjustment device. Alternatively, the ECU 150 may be configured to include an integrated pad wear amount storage unit, a pad wear limit estimation unit, and a nut clearance adjustment unit. The integrated pad wear amount storage device is configured to integrate and store data corresponding to a pad wear amount and to reset, if necessary, data, and may execute the aforementioned first processing, second processing, and fifth processing. The pad wear limit estimation device is configured to detect that an integrated amount, corresponding to a pad wear amount while a parking brake is not being used, is larger than or equal to the set value and to make an adjustment request after the detection, and may execute the aforementioned third processing. The nut clearance adjustment device is configured to perform an adjustment operation by determining a vehicle state when an adjustment request is made, and may execute the aforementioned fourth processing.

Figure 7:
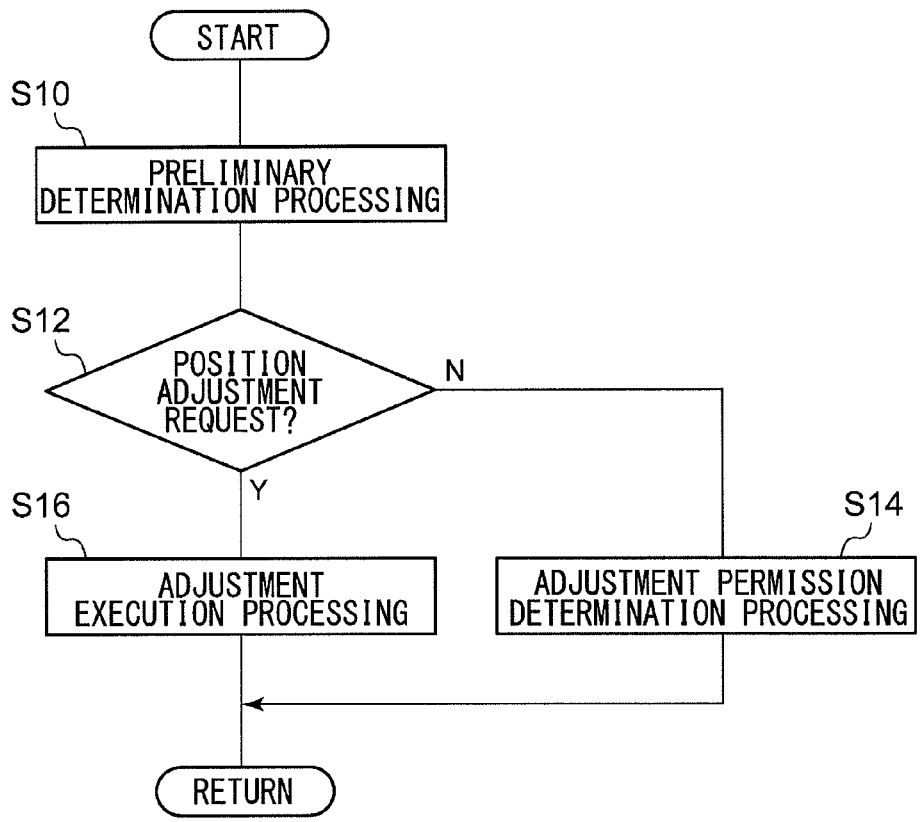
FIG. 7 is a flowchart for describing relative position adjustment processing according to an embodiment.

FIG. 7 is a flowchart for describing relative position adjustment processing according to an embodiment. The ECU 150 repeatedly executes this processing (e.g., at every operation period in the ECU 150). As illustrated in FIG. 7, the ECU 150 first executes preliminary determination processing (S10). The preliminary determination processing is one to be executed prior to the adjustment of a relative position between the nut member 60 and the piston member 30, and includes resetting a wear amount in accordance with a determination result or writing a wear amount into a non-volatile memory to store it. Although the preliminary determination processing is included in the relative position adjustment processing in this example, the preliminary determination processing is not limited thereto and may be executed in parallel with or independently of the later-described adjustment permission determination processing and adjustment execution processing. An example of this preliminary determination processing will be described in more detail with reference to FIG. 8.

When the preliminary determination processing is completed, the ECU 150 determines whether a request for adjusting the positions of the nut member 60 and the piston member 30 has been made in the last or further-preceding processing (S12). The ECU 150 determines that such a request has been made when a flag representing a position adjustment request is on; on the other hand, determines that such a request has not been made when the flag is off.

When it is determined that such a request has not been made (S12/N), the ECU 150 executes adjustment permission determination processing (S14). The adjustment permission determination processing includes updating a pad wear amount and determining whether the last wear amount exceeds a determination threshold value. When a wear amount exceeds the determination threshold value, the ECU 150 makes a request for adjusting the positions of the nut member 60 and the piston member 30. When the adjustment permission determination processing is completed, the processing illustrated in FIG. 7 is ended. An example of this adjustment permission determination processing will be described in more detail with reference to FIG. 9.

When it is determined that such a request has been made (S12/Y), the ECU 150 executes adjustment execution processing (S16). The adjustment execution processing includes adjusting the positions of the nut member 60 and the piston member 30 by driving the electric motor 68. In an embodiment, the adjustment execution processing may further include processing in which it is determined, based on a vehicle state, whether it is at an appropriate timing for executing the adjustment. When the adjustment execution processing is completed, the processing illustrated in FIG. 7 is ended. An example of this adjustment execution processing will be described in more detail with reference to FIG. 10.

Although the relative position adjustment processing illustrated in FIG. 7 includes both the adjustment permission determination processing and the adjustment execution processing, it is not limited thereto. For example, the ECU 150 may execute first processing including the adjustment permission determination processing and second processing including the adjustment execution processing in parallel with each other. In this case, the first processing may include determining presence/absence of the position adjustment request and executing the adjustment permission determination processing when such a request is absent. The second processing may include determining presence/absence of such a request and executing the adjustment execution processing when such a request is present.

Figure 8:
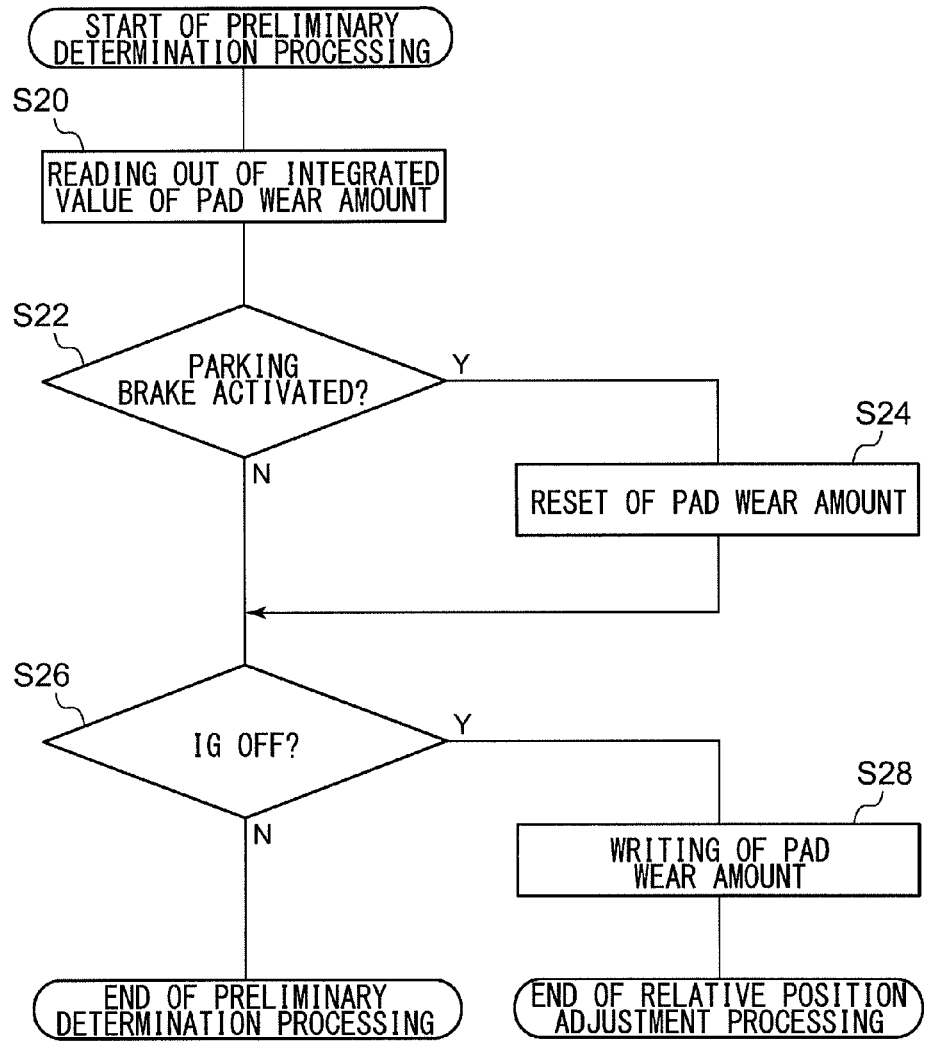
FIG. 8 is a flowchart for describing preliminary determination processing according to an embodiment.

FIG. 8 is a flowchart for describing the preliminary determination processing (S10) according to an embodiment. The ECU 150 first reads an integrated value of a pad wear amount stored in a non-volatile memory into an accompanying volatile memory (S20). It is sufficient to execute this reading processing in executing the preliminary determination processing or the relative position adjustment processing that are executed in the first time after the activation of the ECU 150, and the reading processing can be omitted in the subsequent processing.

The ECU 150 determines whether a parking brake operation has been performed (S22). Specifically, the ECU 150 determines whether a parking brake operation has been performed between the last processing and this time processing. The information on the presence/absence of a parking brake operation is stored, for example, in the ECU 150 or a memory accompanying the ECU 150, and the ECU 150 determines with reference to this information. When a parking brake operation has been performed (S22/Y), the ECU 150 resets an integrated value of a pad wear amount (S24). That is, the ECU 150 updates the integrated value of a pad wear amount until then to zero. It is because, when a parking brake operation has been performed in the brake device 10, the positions of the nut member 60 and the piston member 30 are automatically adjusted by the aforementioned brake releasing operation.

When a parking brake operation has not been performed (S22/N), the ECU 150 determines whether IG has been turned off (S26). Herein, the "IG has been turned off" typically means that an ignition switch of a vehicle has been turned off; however, it is not limited thereto, but may mean an arbitrary operation or state between when the operation of the ECU 150 is ended and when the data stored in a volatile memory accompanying the ECU 150 is deleted. When IG has been turned off (S26/Y), the ECU 150 writes an integrated value of a pad wear amount into a non-volatile memory (S28), and the preliminary determination processing illustrated in FIG. 8 is ended. When IG has not been turned off (S26/N), the ECU 150 successively determines presence/absence of a position adjustment request (S12 in FIG. 7).

Figure 9:
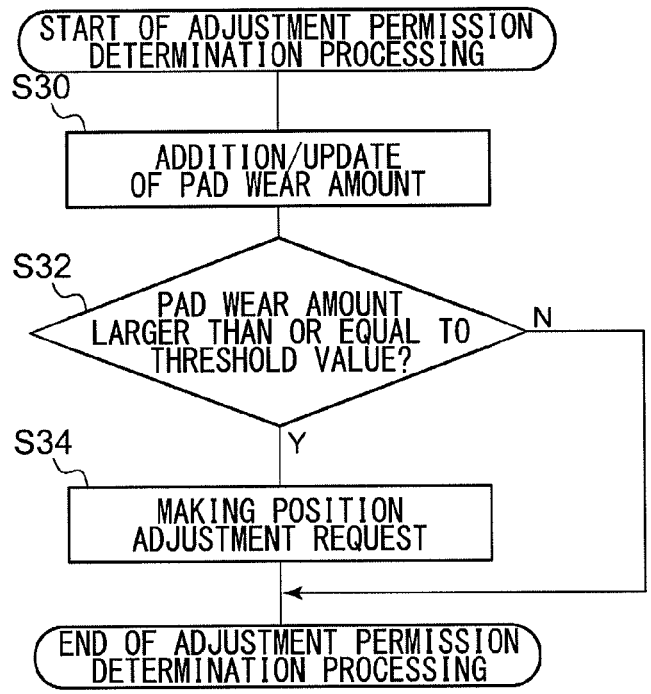
FIG. 9 is a flowchart for describing adjustment permission determination processing according to an embodiment.

FIG. 9 is a flowchart for describing adjustment permission determination processing (S14) according to an embodiment. When it is determined that an adjustment request has not been made (S12/N in FIG. 7), the ECU 150 executes integration processing of a pad wear amount (S30). When the brake device 10 comprises a sensor for measuring a wear amount of the pad 16, the ECU 150 updates a pad wear amount based on a value measured by the sensor. The ECU 150 executes arithmetic processing for updating a wear indicator amount that reflects a pad wear amount, instead of actual measurement of a wear amount. The wear indicator amount is a value by which it can be evaluated that a wear amount of the pad 16 is increased when the value is increased, and the value may be any one of an estimated value of a pad wear amount, integrated value of a brake load, accumulated number of times of IG on/off, and integrated travel distance of vehicle. The ECU 150 may obtain an estimated value of a pad wear amount from, for example, an integrated value of a brake load by using, for example, a map stored in advance. The brake load can be calculated by using, for example, a vehicle weight and brake fluid pressure.

The ECU 150 determines whether the adjustment permission condition is satisfied (S32). The adjustment permission condition may include a condition that the pad wear amount or wear indicator amount updated by the integration processing exceeds a threshold value, and may further include other conditions. When the wear indicator amount is, for example, an estimated value of a pad wear amount, the ECU 150 determines whether the estimated value exceeds a predetermined wear amount threshold value. When the wear indicator amount is an integrated value of a brake load, the ECU 150 determines whether the integrated value exceeds a predetermined brake load threshold value. When the wear indicator amount is the accumulated number of times of IG on/off, the ECU 150 determines whether the number of times exceeds a predetermined number of times threshold value. When the wear indicator amount is an integrated travel distance of vehicle, the ECU 150 determines whether the travel distance of vehicle exceeds whether a predetermined distance threshold value. All of these determination threshold values can be appropriately set by experiment or experience, so that the stroke of the piston member 30, occurring for each of the determination threshold values, is within an acceptable range, taking into consideration the correspondence relationship between a pad wear amount and a wear indicator amount.

When the adjustment permission condition is satisfied (S32/Y), the ECU 150 makes a request for adjusting the positions of the nut member 60 and the piston member 30 (S34). The ECU 150 switches, for example, a flag representing a position adjustment request from off to on. When the adjustment permission condition is not satisfied (S32/N), the ECU 150 ends the adjustment permission determination processing. In this case, the flag representing a position adjustment request is maintained to be still off.

Thus, the ECU 150 integrates a pad wear amount, or a wear indicator amount that reflects the pad wear amount, with the pad wear amount or the wear indicator amount in the last parking brake activation being an original point. The ECU 150 determines that the adjustment permission condition is satisfied when the integrated wear amount or wear indicator amount exceeds the threshold value. Even when IG is turned off, the ECU 150 stores in a non-volatile memory the integrated value obtained up to that time, without deleting the integrated value, to continue the integration of a wear amount. Accordingly, it becomes possible to appropriately make a request for adjusting the positions of the nut member 60 and the piston member 30 by precisely grasping the progress of a pad wear, occurring when a parking brake is not being used for a relatively long period of time including one or more times of IG on/off.

Figure 10:
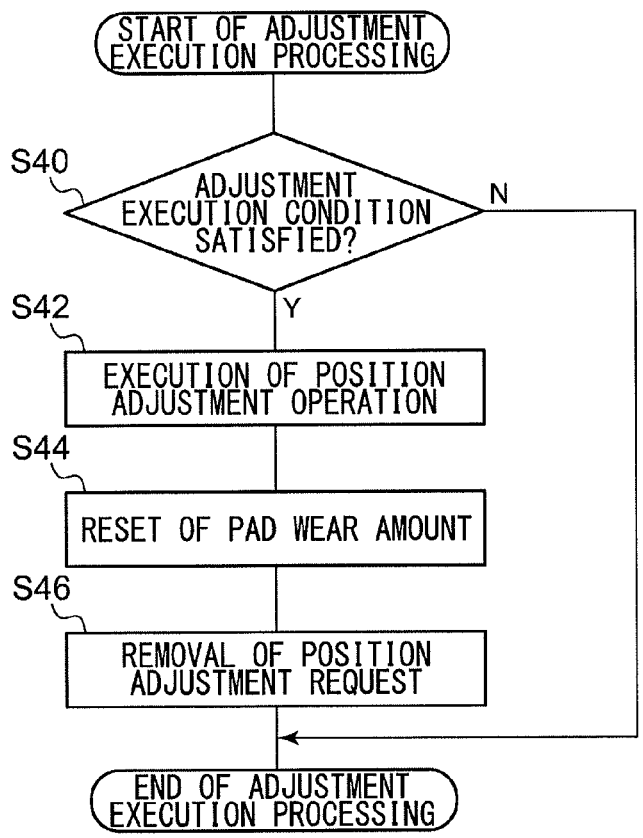
FIG. 10 is a flowchart for describing adjustment execution processing according to an embodiment.

FIG. 10 is a flowchart for describing an adjustment executive processing (S16) according to an embodiment. When it is determined that an adjustment request is made (S12/Y in FIG. 7), the ECU 150 determine whether the adjustment execution condition is satisfied (S40). The adjustment execution condition may include a condition that a vehicle is not in a state of capable of starting immediately, and may further include other conditions. Accordingly, the adjustment execution condition may be one in which, for example: a vehicle is in a parked state with a shift lever being in the P range; or a shift lever is in the P range and IG is turned off. It is preferable that the adjustment execution condition includes at least the condition that a vehicle is in a stopped state.

When the adjustment execution condition is not satisfied, (S40/N), the ECU 150 ends the adjustment execution processing as it is. When the adjustment execution condition is satisfied (S40/Y), the ECU 150 executes an operation of adjusting a relative position between the nut member 60 and the piston member 30 (S42). The position adjustment operation is preferably one in which the nut member 60 is advanced by the electric motor 68 such that the nut member 60 contacts the piston member 30 and subsequently the nut member 60 is pulled back, and accordingly the nut member 60 is brought closer to the piston member 30 than in the state before the adjustment. The aforementioned normal parking brake operation may be used as this operation. Alternatively, the position adjustment operation may be one exclusively performed for the adjustment, in which the nut member 60 is brought close to the piston member 30 by the electric motor 68. In this case, the brake device 10 may be configured to comprise a sensor for detecting the stroke of the piston member 30 such that the ECU 150 determines a position adjustment amount of the nut member 60 by using a detection result of the stroke sensor.

When the adjustment is completed, the ECU 150 resets an integrated value of a pad wear amount (S44), and removes the request for adjusting the positions of the nut member 60 and the piston member 30 (S46). For example, the ECU 150 switches a flag representing a position adjustment request from on to off. Thus, the ECU 150 can execute an adjustment operation at an appropriate timing after the request for adjusting the positions of the nut member 60 and the piston member 30 has been made.

The brake device 10 according to an embodiment of the present invention has the aforementioned configuration. Subsequently, operations of the brake device 10 will be described. With the use of a service brake, the thickness of the pad 16 becomes small due to wear. The piston member 30 is pulled back to the position of the nut member 60 by the action of the spring 106 at the time of the last release of hydraulic brake. Accordingly, an advancement amount of the piston member 30, the amount being required in the next braking, becomes large with the wear of the pad.

When a parking brake is activated and released, the nut member 60 can be stopped by detecting, based on the current sensor 152, a state in which the piston member 30 and the nut member 60 are engaged with each other. Thus, the piston member 30 and the nut member 60 can be made to retreat with the position of the pad 16 being a retreat start position, and they can be stopped at an appropriate distance from the pad 16. With such a so-to-speak automatic adjustment, it can be expected that, in a situation where a parking brake is used at moderate frequency, the stroke of the piston member 30 is not excessively extended and is within an acceptable range.

When a parking brake is not used for a long period of time, the automatic adjustment accompanying a parking brake operation does not function. The nut member 60 remains at the same position with respect to the spindle 70 and the cylinder main body 26, and the braking stroke of the piston member 30 becomes gradually larger as the wear of the pad progresses. Even in such a situation, by executing an operation of the relative position adjustment in which the electric motor 68 and the nut member 60 are advanced to some extent even when a command for operating a parking brake is not issued, an excessive extension of the stroke of the piston member 30 can be suppressed.

In the brake device 10 comprising a piston return mechanism for sufficiently pulling back the piston member 30 provided between the piston member 30 and the nut member 60, the stroke of the piston member 30 can be maintained within an appropriate range over time. Thus, dragging of braking can be reduced or prevented, and an effect and feeling of a brake can be appropriately maintained.

The present invention has been described above based on the preferred embodiments. These embodiments have been described for exemplary purpose only, and it can be readily understood by a person skilled in the art that various modifications may be made by making various combinations of the aforementioned components or processes, which are also encompassed in the scope of the present invention. Hereinafter, such modifications will be described.

Figure 11:
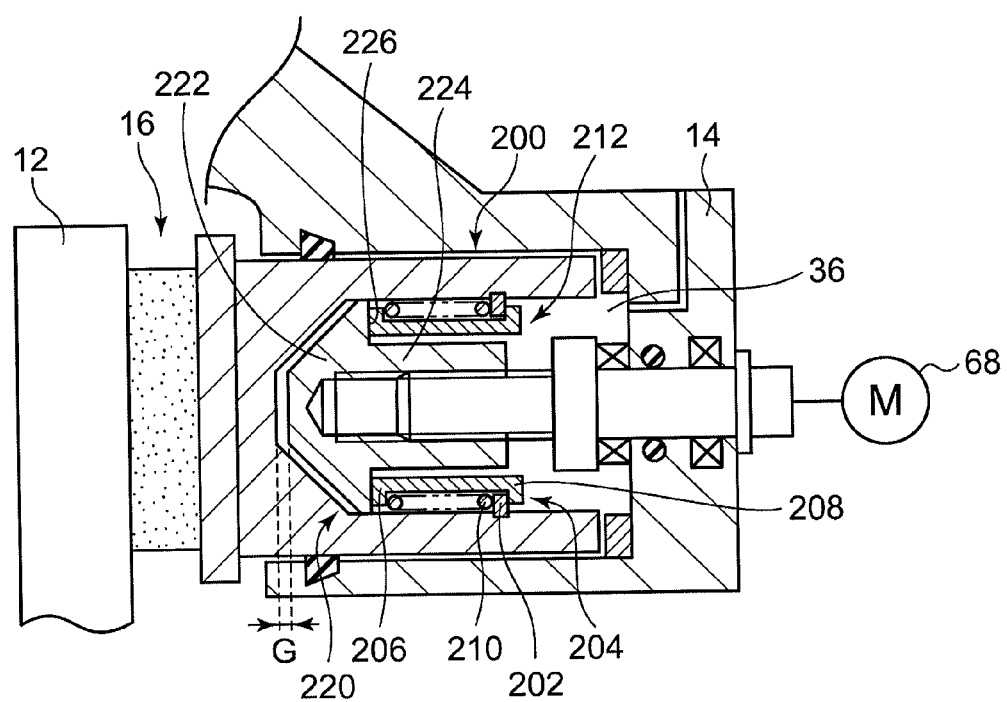
FIG. 11 is a sectional view schematically illustrating the configuration of a brake device according to another embodiment of the invention.

In the brake device 10 illustrated in FIG. 1, the engagement part 100 is held by the nut member 60; however, it is also possible to configure an engagement part 212 so as to be held by a piston member 200, as illustrated in FIG. 11. The aforementioned relative position adjustment processing can also be applied to the brake device illustrated in FIG. 11. For the brevity of the description with respect to the embodiment illustrated in FIG. 11, description of the configurations duplicated with those in the embodiment illustrated in FIG. 1 will be appropriately omitted.

As illustrated in FIG. 11, a spring fixing part 202 projected radially inward is provided near to an opening of the tube part of a piston member 200, and a spring supporting part 204 is held so as to be relatively movable in the shaft direction with respect to the piston member 200, in an attitude in which the spring supporting part 204 sandwiches the spring fixing part 202. The spring supporting part 204 is a member formed into a hollow cylindrical shape, and protruding parts 206 and 208 each projected radially outward are provided on both the side portions in the shaft direction thereof, respectively. One end of a spring is attached to the protruding part 206 located near to the front end of the spring supporting part 204, and the other end is attached to the spring fixing part 202. Similarly to the aforementioned embodiment, a set load is applied to the spring 210 in a state where the protruding part 208 located near to the back end of the spring supporting part 204 and the spring fixing part 202 are contacted each other. The engagement part 212 is configured to include the spring fixing part 202, the spring supporting part 204, and the spring 210. The protruding part 206 located near to the front end of the spring supporting part 204 can be engaged by contacting an annular stepped surface 226 that connects a large-diameter part 222 and a small-diameter part 224 of a nut member 220 together.

In the brake device illustrated in FIG. 11, the piston member 200 relatively advances with respect to the nut member 220 by supplying fluid pressure to the fluid pressure chamber 36 when a service brake is activated. With the spring fixing part 202 advancing integrally with the piston member 200 in a state where the front end 206 of the spring supporting part 204 contacts the stepped surface 226 in the nut member 220, the distance between the front end 206 of the spring supporting part 204 and the spring fixing part 202 is made small, that is, the spring 210 is compressed. Braking force is generated with the pad 16 being pressed by the disk rotor 12 with the advancement of the piston member 200, on the other hand, pulling back force acts on the piston member 200 from the spring 210. When a service brake is released, the piston member 200 is pulled back to the initial position by this pulling back force.

When a parking brake is activated, the nut member 220 advances with the electric motor 68 being driven. The piston member 200 is also pushed out with the front end of the nut member 220 pushing out the back surface of the piston member 200, thereby allowing the piston member 200 to be pressed by the pad 16 and the disk rotor 12. On the other hand, when a parking brake is released, the nut member 220 retreats with the electric motor 68 being driven in an opposite direction. When the stepped surface 226 of the nut member 220 contacts the front end 206 of the spring supporting part 204, the piston member 200 is pulled back integrally with the nut member 220.

In the brake device 10 illustrated in FIG. 1, the nut member 60 is housed in the fluid pressure chamber 36 in the piston member 30; however, it is also possible to provide the nut member 60 outside the piston member 30. For example, an annular movable member that arranged around the outer circumference of the piston member 30 may be provided in an annular groove portion formed around the outer circumference of the piston member 30. This movable member is configured to be movable in the shaft direction by an appropriate driving means. The piston member 30 is pushed forward by the engagement between the front end of the movable member and the side surface of the groove portion, the side surface facing the front end; while the piston member 30 is pulled back by the engagement between the back end of the movable member and the side surface of the groove portion, the side surface facing the back end. Similarly, a piston return mechanism including a spring can be formed, for example, between the back end of the movable member and the piston member 30. As a further different modification, a movable member to be driven by a motor and a power transmission mechanism can also be used, instead of the piston member 30 to be driven by fluid pressure.

INDUSTRIAL APPLICABILITY

According to the present invention, the positions of movable components in a brake device can be appropriately adjusted.

REFERENCE NUMERALS

10 BRAKE DEVICE
12 DISK ROTOR
14 CALIPER
16 PAD
26 CYLINDER MAIN BODY
30 PISTON
32 PISTON SEAL
34 BRAKE CYLINDER
38 FLUID PRESSURE SOURCE
40 FLUID PRESSURE ACTUATOR
60 NUT MEMBER
64 POWER TRANSMISSION MECHANISM
68 ELECTRIC MOTOR
100 ENGAGEMENT PART
106 SPRING
150 ECU
152 CURRENT SENSOR

The invention claimed is:

1. A friction brake device for a vehicle, comprising:
a hydraulic brake unit including a piston member that is configured to be movable by an action of brake fluid pressure and to press a friction member by advancement;
an electric brake unit including a nut member that is configured to be relatively movable in a piston movement direction with respect to the piston member by a motor and to press the piston member by advancement, and configured such that a position of the nut member is maintained with respect to the motor when the motor is not in operation;
a piston return mechanism including a biasing member that is arranged so as to make biasing force, oriented in a retreat direction, elastically act on the piston member in accordance with an advancement amount of the piston member from a movement start position with respect to the nut member, the movement start position of the piston member being determined by the position at which the nut member is maintained, and the advancement amount being provided by an action of the hydraulic brake unit; and
a controller for controlling the motor, wherein
the controller determines whether an adjustment permission condition associated with a wear amount of the friction member is satisfied, and when the condition is satisfied, the controller allows the motor to perform a relative position adjustment of the nut member with respect to the piston member, and wherein
the relative position adjustment includes updating the position at which the nut member is maintained when the motor is not in operation.

2. The brake device according to claim 1, wherein
when a wear indicator amount that reflects the wear amount of the friction member exceeds a threshold value, the controller determines that the permission condition is satisfied.

3. The brake device according to claim 1, wherein
the controller determines that, when the wear amount or the wear indicator amount is increased by at least a threshold value in comparison with a wear amount, or a wear indicator amount that reflects the wear amount, of the friction member in the last activation of the electric brake unit, the permission condition is satisfied.

4. The brake device according to claim 1, wherein the controller determines whether an adjustment execution condition that is based on a vehicle state is satisfied, and when the condition is satisfied, the controller executes the relative position adjustment.

5. The brake device according to claim 1, wherein
the electric brake unit includes a power transmission mechanism configured to connect the nut member to the motor and to maintain the position of the nut member when the motor is not in operation, and wherein
the relative position adjustment is an operation in which the nut member is brought close to the piston member by activating the electric brake unit.

6. The brake device according to claim 1, wherein
the relative position adjustment is an operation in which the nut member is brought close to the piston member by activating the electric brake unit such that the nut member advances and contacts the piston member to be pulled back.

7. The brake device according to claim 1, wherein
one end of the biasing member is attached to one of the piston member and the nut member and the other end is attached to a supporting part, and the supporting part is arranged to be able to contact the other of the piston member and the nut member by a relative movement of the two members.

8. The brake device according to claim 1, wherein
the nut member and the piston member are arranged to have, in the piston movement direction, a clearance by which the nut member retreats from the piston member in a non-contact manner.

9. A brake device comprising:
a first movable member configured to contact and press a friction member and to be driven by a first driving source;
a second movable member that is configured to contact and press the first movable member to press the friction member together with the first movable member and that is configured to be driven by a second driving source different from the first driving source;
a first movable member-pulling back mechanism that is provided, in order to release a brake, between the first movable member and the second movable member to pull back, by an engagement between the first movable member and the second movable member, the first movable member in a direction opposite to a pressing direction in which the friction member is pressed; and
a controller configured to determine, based on a wear amount of the friction member, whether it is needed to perform, by the second driving source, a relative position adjustment of the second movable member with respect to the first movable member, wherein the second movable member is configured such that, when the first movable member is driven in the pressing direction by the first driving source, a position of the second movable member is maintained in the pressing direction, and wherein the relative position adjustment includes updating the position at which the second movable member is maintained in the pressing direction.

10. The brake device according to claim 9, wherein the first movable member-pulling back mechanism includes a biasing member for making biasing force, oriented in the opposite direction, elastically act on the first movable member in accordance with a relative movement amount in the pressing direction of the first movable member with respect to the second movable member.

* * * * *